Jan. 22, 1924.
H. R. SCHUTZ
1,481,330
CONVEYING APPARATUS
Filed March 23, 1922
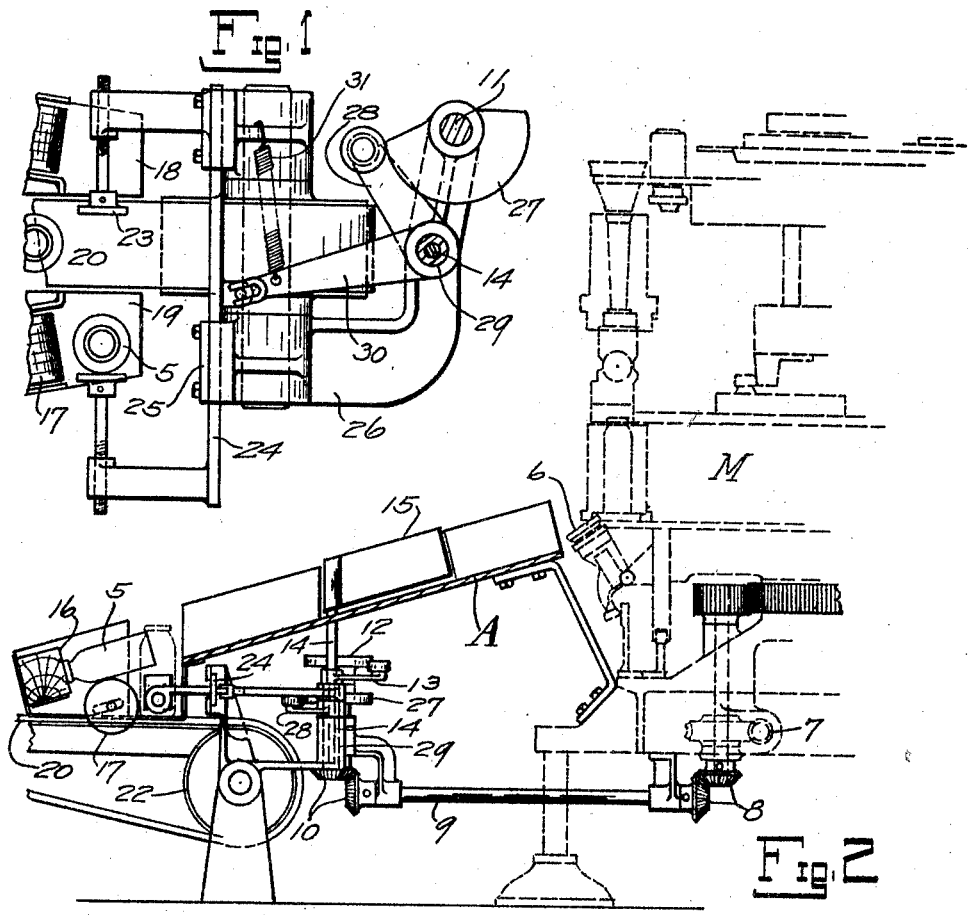
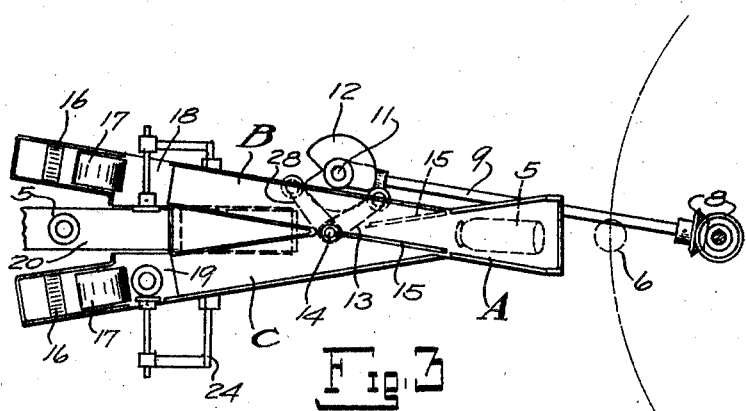
INVENTOR
HAROLD R. SCHUTZ
BY J.F.Rule
HIS ATTORNEY Patented Jan. 22, 1924.

1,481,330

UNITED STATES PATENT OFFICE.

HAROLD R. SCHUTZ, OF TOLEDO, OHIO, ASSIGNOR TO THE OWENS BOTTLE COMPANY, OF TOLEDO, OHIO, A CORPORATION OF OHIO.

CONVEYING APPARATUS.

Application filed March 23, 1922. Serial No. 545,939.

*To all whom it may concern:*

Be it known that I, HAROLD R. SCHUTZ, a citizen of the United States, residing at Toledo, in the county of Lucas and State of Ohio, have invented new and useful Improvements in Conveying Apparatus, of which the following is a specification.

My invention relates to apparatus for transferring bottles or other articles from one position to another, and more particularly to apparatus for receiving such articles in a cumbent or inclined position, and setting them in an upright position on a conveyor.

The invention as herein shown is designed and adapted for use with a bottle blowing machine and provides an inclined chute on which the bottles are received from the blowing machine. The bottles slide down the chute by gravity and are automatically placed in an upright position at the lower end of the chute on a conveyor by which they may be carried to a leer.

An object of the invention is to provide a simple and practical mechanism capable of handling the articles as rapidly as they are delivered thereto by a modern glass blowing machine. The bottles or other articles as delivered from the forming machine are hot and easily deformed or broken and must be handled with considerable care. The usual bottle setting-up devices are not designed or adapted to handle the bottles with the speed required in connection with some of the automatic machines at present in use. The present invention is designed to overcome this difficulty, and for this purpose the bottles or articles delivered from the blowing machine are directed alternately by a suitable switch to separate chutes. Associated with each chute are means to turn the bottles to an upright position and place them upon an endless conveyor.

Other objects of the invention will appear hereinafter.

In the accompanying drawings:

Figure 1 is a plan view of an apparatus constructed in accordance with my invention, the inclined chute being omitted.

Figure 2 is a sectional elevation of the apparatus combined with an automatic bottle blowing machine.

Figure 3 is a plan view of the apparatus.

An inclined trough or chute A is arranged to receive bottles or other articles 5 as they drop by gravity from the mold bottoms 6 of an automatic glass blowing machine M. This machine comprises a mold carriage driven continuously from a drive shaft 7 through suitable gearing. Motion is also transmitted from the shaft 7 through gearing including gears 8, shaft 9 and gears 10, to a vertical drive shaft 11. A cam 12 on the shaft 11 actuates a rock arm 13 on a vertical rock shaft 14 carrying a switch 15. The cam 12 operates to oscillate the switch alternately to the full line and broken line positions shown in Figure 3, so that the bottles 5 are directed alternately to troughs or trough sections B and C which form branches of the chute A.

A bottle delivered neck end first to the chute A slides endwise by gravity down the chute A, B, and is arrested by striking a wooden block or other stop 16. A support 17 which may consist of a cylindrical wooden block or roll, adjustable toward and from the stop 16, temporarily supports the bottle at a point forward of the center of gravity of the bottle, so that the latter rolls or tilts back to an upright position on a stationary platform 18. The next bottle is directed to the chute C, the switch 15 in the meantime having been thrown to the dotted line position (Fig. 3), and is set up on a platform 19. Between the platforms 18 and 19 is an endless conveyor 20 running over a pulley 22, which conveyor may be driven continuously and carries the bottles to an annealing oven or leer.

The bottles are moved from the stationary platforms 18 and 19 onto the conveyor by pushers 23 adjustably mounted on a frame 24. This frame is mounted to reciprocate horizontally in guides 25 on a stationary frame 26. The frame 24 is reciprocated by a cam 27 on the shaft 11. The cam operates a rock arm 28 carried by a sleeve 29 on the shaft 14, which sleeve also carries a rock arm 30 having a driving connection with the frame 24. A spring 31 holds the arm 28 against its cam. The pushers 23 operate alternately to push the bottles or other articles from the platforms 18 and 19 onto the conveyor 20.

It will be noted that the mechanism for operating the switch and the pushers is geared to operate in synchronism with the movements of the blowing machine M. The articles are delivered one by one to the chute so that they slide lengthwise by gravity singly or in spaced relation down the chute. The gearing is so proportioned that the switch is operated once after each article is delivered to the chute. A pusher 23 is also operated for each article delivered to one of the platforms 18, 19. These pushers operate in synchronism with the switch and are so timed that each pusher operates after a bottle has been set in upright position in its path. The timing of the pushers relative to that of the switch may be adjusted by adjusting the relative positions of the cams 12 and 27. By adjusting the pushers in the frame 24 they can be adapted to operate with ware of different sizes.

Modifications may be resorted to within the spirit and scope of my invention.

What I claim is:

1. The combination with a conveyor, of an inclined chute down which articles move lengthwise in spaced relation by gravity, automatic means to direct the articles alternately to different setting-up positions, means to turn the articles to upright position, and automatic means interconnected with said directing means and operating in synchronism therewith to place said articles on the conveyor.

2. The combination of a conveyor, setting-up devices at opposite sides of the conveyor, automatic means to direct articles alternately from a common source to said setting-up devices and cause them to assume an upright position, and automatic means interconnected with said directing means and operating in synchronism therewith to shift said articles onto the conveyor.

3. The combination of an inclined chute to receive articles, branch chutes extending therefrom, a switch at the junction of said chutes to direct the articles alternately to said branch chutes, a conveyor between said branch chutes, and automatic means interconnected with said switch to transfer the articles onto the conveyor.

4. The combination of an inclined chute to receive articles, branch chutes, a switch positioned to direct articles from said inclined chute to a branch chute, automatic means to operate the switch to direct the articles alternately to said branch chutes, a conveyor between said branch chutes, automatic means to turn the articles from a cumbent to an upright position, and automatic means operating in synchronism with the operations of the switch to place the articles on the conveyor.

5. The combination of an inclined chute to receive articles, branch chutes, a switch in cooperative relation to the chutes and automatically operated to direct the articles alternately to said branch chutes, a conveyor between said branch chutes, automatic means to cause the articles to be moved by gravity to upright positions at opposite sides of the conveyor, and means interconnected with the switch and operating in synchronism therewith to shift the articles while in upright position onto the conveyor.

6. The combination of an inclined chute, a switch in cooperative relation to said chute, branch chutes to which articles are directed alternately by the switch, a continuously moving conveyor between the branch chutes, stationary platforms, means to direct articles moving down said chutes, to an upright position on said platforms, and means to shift the articles from the platforms onto the conveyor.

7. The combination of an inclined chute, a switch in cooperative relation to said chute, branch chutes to which articles are directed alternately by the switch, a continuously moving conveyor between the branch chutes, stationary platforms, means to direct articles moving down said chutes, to an upright position on said platforms, and automatic pusher devices operating in synchronism with the movements of the switch to push articles from the platforms alternately onto the conveyor.

8. The combination of an inclined chute, branch chutes extending therefrom, a switch in cooperative relation to said chutes and shiftable to direct articles from said inclined chute to the branch chutes alternatively, a horizontal conveyor between the branch chutes, means to direct articles to an upright position as they are delivered from the branch chutes, pushers, a frame carrying said pushers and mounted to reciprocate in a direction transverse to the conveyor and thereby push said articles onto the conveyor, and cams to operate said reciprocating frame and said switch.

9. The combination of a horizontally traveling conveyor, an inclined chute to receive articles in a cumbent position, means to direct said articles alternately to opposite sides of the conveyor while in said cumbent position, means to then guide them to an upright position under the influence of gravity, and means operating in synchronism with said directing means to move the articles while in said upright position onto the conveyor.

10. The combination of a receiving chute, a horizontally traveling conveyor, branch chutes, a switch by which articles are directed from the receiving chute to the branch chutes alternately, setting-up devices at opposite sides of the conveyor including stops to arrest the articles as they are delivered from the branch chutes, supports positioned to support the articles at points forward of their centers of gravity at the moment they are arrested, said supports shaped and positioned to permit the articles to tilt back by gravity to an upright position at the sides of the conveyor, and pushers interconnected with said switch and automatically operating transversely of the conveyor in synchronism with the movements of the switch to push the articles onto the conveyor.

Signed at Toledo, in the county of Lucas and State of Ohio, this 18th day of March, 1922.

HAROLD R. SCHUTZ.